United States Patent [19]

Knapp

[11] Patent Number: 5,111,842
[45] Date of Patent: May 12, 1992

[54] CARTRIDGE FOR A VALVE WITH HARD MATERIAL PLATES, HAVING MEANS FOR RETAINING THE FIXED PLATE IN CONSTRAINT STATE

[75] Inventor: Alfons Knapp, Biberack/Riss, Fed. Rep. of Germany

[73] Assignee: Gevipi A.G., Vaduz, Liechtenstein

[21] Appl. No.: 674,963

[22] Filed: Mar. 26, 1991

[30] Foreign Application Priority Data

Apr. 2, 1990 [IT] Italy ............... 67243 A/90

[51] Int. Cl.⁵ ............................................. F16K 11/06
[52] U.S. Cl. .......................... 137/454.6; 137/625.17; 251/363
[58] Field of Search .................. 251/363, 359; 137/625.17, 454.6, 454.2

[56] References Cited

U.S. PATENT DOCUMENTS

4,610,268  9/1986  Knapp .
4,633,906  1/1987  Tuchman ............. 137/625.17

FOREIGN PATENT DOCUMENTS

1183957  10/1987  Italy .

WO89/02558  3/1989  PCT Int'l Appl. .......... 137/625.17

*Primary Examiner*—Alan Cohan
*Attorney, Agent, or Firm*—Young & Thompson

[57] ABSTRACT

A cartridge for a mixer valve comprising a cage, a supporting member for a hard material plate, a hard material plate mounted, operatively stationary, in this supporting member, at least one sealing gasket interposed between the fixed plate and the supporting member, and retaining structure arranged for connecting the fixed plate to the respective supporting member with a gasket compressed therebetween, in such a way as to maintain between these parts a constraint state, wherein the supporting member for the fixed plate is formed by a bottom applied to the cartridge cage, this latter having a seat intended for direct support of the fixed plate, and the retaining structure operating between the cage and the bottom of the cartridge. In this way the compression of the gasket is obtained without applying to the fixed plate any concentrated strain capable of damaging the same. Moreover the bottom may have sealing structure of different shapes and kinds, in order to render the cartridge suitable for application in different kinds of valves.

11 Claims, 1 Drawing Sheet

CARTRIDGE FOR A VALVE WITH HARD MATERIAL PLATES, HAVING MEANS FOR RETAINING THE FIXED PLATE IN CONSTRAINT STATE

BACKGROUND OF THE INVENTION

This invention refers to a replaceable cartridge for a valve, comprising a cartridge cage, a supporting member for a hard material plate, a hard material plate mounted, operatively stationary, in said supporting member, and at least one sealing gasket interposed between said fixed plate and said supporting member. As well known, a cartridge of this kind further includes control means and at least one movable plate operatively connected to said control means and intended to displace contacting the fixed plate in order to regulate the mixing ratio of cold and hot water supplied to the valve, as well as the delivery rate of the mixed water.

In order that they may perform an effective closure and regulation, the fixed plate and the movable plate of a cartridge of this kind should be pressed the one against the other by an adhesion force proportionate to the pressure of the entering water, because in the contrary case the water pressure might take one plate out of the other, thus preventing their mutual cooperation; and moreover, a suitable force should be applied between the fixed plate and the respective supporting member, order to compress the gasket or gaskets interposed between these parts, to both purposes of ensuring the sealing action and of preventing the expulsion of the gasket or a deformation thereof in case that over pressures take place.

In most known constructions, the fixed plate simply rests on the respective supporting member, which consists in a seat offered by the cartridge cage itself or by a bottom applied to the cage. Both the adhesion force to be applied between the fixed plate and the movable plate, and the compression force to be applied to the gasket interposed between the fixed plate and the respective supporting member, are obtained by applying a force which presses the supporting member towards the movable plate, or vice-versa, whereby this force operates both between the supporting member and the fixed plate, thus compressing the gasket, and between the fixed plate and the movable plate, thus keeping them mutually adherent. A consequence, the adhesion force between the plates and the compression force applied to the gasket are equal to each other and to the applied force. Therefore, the applied force should be always at least equal to the greater of the two forces required for the stated purposes.

In most cases, the force required for compressing the sealing gasket and for keeping the same safety in its correct position is very much greater than the force required for operatively keeping at mutual contact the fixed plate and the movable plate, and therefore, in all such cases, between the plates there is applied a force unnecessarily great for its purpose. Such excessive force applied between the plates renders less sliding the control of the valve and causes unnecessary mechanical stresses of the component parts.

The Italian Patent No. 1,183,957 (on which is based PCT/US 87/00542) of the same Inventor has proposed to provide retainment means arrange for connecting the fixed plate to the respective supporting member, with the gasket compressed therebetween, in such a way as to maintain between these parts a constraint state.

Thanks to this arrangement, the compression applied to the sealing gasket of the fixed plate depends on the elastic characteristics of the gasket itself and on the geometrical characteristics of the gasket, the retainment means and the connected parts, and this compression is permanently maintained by the retainment means as a constraint force internal to the system formed by the foxed plate, the respective supporting member and the corresponding gaskets, and independent from the forces applied from the exterior to the fixed plate and its respective supporting member. Therefore it is possible to assign to these forces only the task of generating the operative adhesion needed between the fixed plate and the movable plate. The adhesion force between the plates may then be fixed or variable, but in any event it may be chosen by taking into account only the need for adhesion between the plates, irrespective of the need for compressing and retaining the gasket of the fixed plate.

However, the fact that the retainment means are provided to operate directly on the fixed plate in order to press the same against the respective supporting member implies that concentrated stresses are applied to the fixed plate. Because the plates are made of ceramic material or other hard and brittle material, the breakage of a relatively high percentage of plates is to be feared, at the time of mounting the cartridge or subsequently.

SUMMARY OF THE INVENTION

The main object of this invention is of improving in a simple and rational way the measure proposed by the cited Italian Patent No. 1,183,957, in order to obtain that a force sufficient for compressing the sealing gasket against the supporting member may be applied to the fixed plate without giving rise to any stress concentration and therefore to the danger of breaking the fixed plate.

Another object of this invention is of obtaining the stated action by means which also allow an easy adaptation of the cartridge for its application to valves in which the hydraulic sealing means between the valve body and the cartridge are of different types.

The main object of the invention is attained in that the supporting member for the fixed plate is formed by a bottom applied to the cartridge cage, that the cartridge cage has a seat intended for direct support of the fixed plate, and that between the cage and the bottom of the cartridge there are provided retainment means so arranged that, when they are in use, the bottom presses the fixed plate, through an interposed gasket, against the seat provided in the cartridge cage.

Thanks to this arrangement, the stress concentrations unavoidably due to the presence of retainment means are applied to the cage and the bottom of the cartridge, both parts which, without difficulty, may be designed in order to sustain such strains, whereas the brittle fixed plate is compressed between a yielding gasket and a seat provided for this purpose in the cartridge cage, which seat may easily be designed in order to offer to the fixed plate a uniform support surface of an extent sufficient to avoid concentrated or excessive pressures. In this way any danger of breaking the fixed plate is systematically avoided. On the other hand, a great freedom in deigning the retainment means is allowed, and it becomes easy to configure said retainment means both pursuant to economy considerations and in such a way as to attain the maximum ease in mounting the cartridge. For example, the retainment means may have the shape of teeth with elastic release.

In its turn, the bottom applied to the cartridge should have sealing means acting towards the valve body, or parts intended to cooperate with sealing means provided in the valve body, and, as known, such sealing means may be different in the various embodiments of the valves. Until now this gave rise to the need for using different cartridges in different valves. On the contrary, thanks to the application of this invention, the same cartridge maybe adapted to its application on different valves by simply mounting thereon a different bottom, suitable for the valve for which the cartridge is intended, and more particularly for the sealing means provided in the valve between the valve body and the cartridge. This allows standardization of the manufacture of cartridges intended for different valves.

BRIEF DESCRIPTION OF THE DRAWING

These and other characteristics and advantages of the subject of the invention will be more clearly apparent from the following description of some embodiment, given by way of non limitative examples and diagrammatically shown in the appended drawing, wherein.

DETAILED DESCRIPTION OF THE PREFERRED EMBODIMENTS

Figure 1:
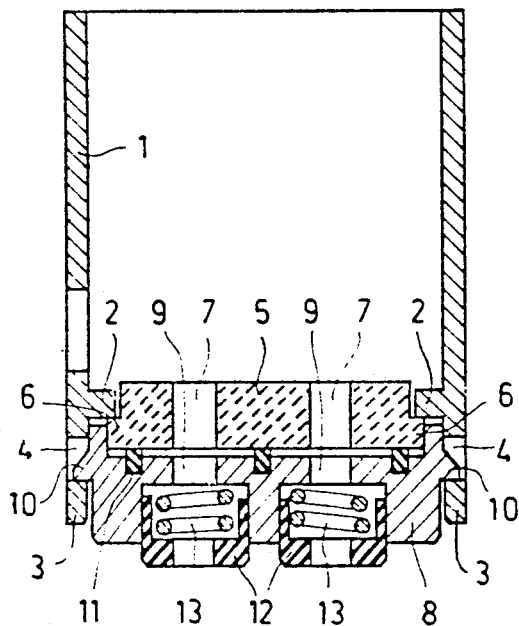
FIG. 1 shows the cross section of the bottom end of the cartridge for mixing valve, including the arrangement of a fixed plate according to a first embodiment of the invention.

The cartridge for mixing valve shown in FIG. 1 comprises a housing, or cage 1 intended to enclose the cartridge mechanisms, which have not been shown because they have no connection with the application of this invention and might be of any known type. An example of such mechanisms may be seen in the U.S. Pat. No. 4,610,268 of the same Inventor, whose contents in this respect are to be considered incorporated herein by reference. Cage 1 has at its bottom end (with respect to the position shown in the drawing) a shoulder 2 determining a seat. Into the seat of shoulder 2 is inserted from below an operatively fixed plate 5, which as through passages 7 for hot and cold water. The fixed plate 5 has at its periphery a projection 6 shaped as a flange, by means of which the plate rests in the seat formed by shoulder 2 of the cartridge cage. Flange 6 may be uninterrupted, or it may be interrupted, particularly for the purpose of forming a means for imposing a correct mounting position of the fixed plate 5 in the seat of shoulder 2. Within the not shown mechanism of the cartridge there is, as it is well known, a movable plate which slided in contact with fixed plate 5 under action of control members, in order to cover or uncover the passages 7 and therefore to control the water flow which traverses the valve, both with respect to the mixing ratio between hot and cold water and with respect to the flow rate of the mixed water. Cage 1 extends beyond shoulder 2 and it forms projections 3 provided with openings 4.

The bottom for the cartridge is formed by a member 8 separated from the cage 1, and it has passages 9 for water which correspond to the passages 7 of the fixed plate 5. Moreover bottom 8 has teeth 10 by means of which it engages openings 4, thus establishing a connection with cage f1. An elastic sealing gasket 11 is interposed between fixed plate 5 and bottom 8. In the embodiment shown gasket 11 is partially inserted in a seat hollowed to this purpose in bottom 8. Bottom 8 is so shaped and sized that, when it is connected by teeth 10 to cage 1, with the fixed plate 5 and the gasket 11 in correct position, the elastic gasket 11 is suitably compressed between the bottom 8 and the fixed plate 5, which in its turn rests with its peripheral flange 6 in the seat offered by shoulder 2 of the cartridge cage 1. As it may be understood, there is no difficultly in shaping the shoulder 2 of cage 1 and the peripheral flange 6 of the fixed plate 5 so that this later finds an extended and uniform support on the seat of cage 1, in such a way that no concentration of stress takes place, whereas at the opposite side the fixed plate 5 is pressed by the elastic gasket 11, which by its own nature does not give rise to concentrated stresses. Therefore there is no danger that the fixed plate 5 becomes broken or cracked.

On the other hand teeth 10, in cooperating with openings 4 of the projections 3 of cage 1, certainly generate concentrated stresses, but both the bottom 8 and the cage 1 may easily be made of such materials and with such shapes that they may sustain such concentrated stressed without damage. In most cases said members may be manufactured of plastics.

More particularly it may be provided that the projections 3 of cage 1, wherein openings 4 are formed, be elastically deformable, and this renders very handy the operation of connecting bottom 8 to cage 1. In this way it is possible to design the parts economically and, at he same time, to render easy and therefore economical the operations of the mounting the parts of by elastic release.

In the embodiment shown in FIG. 1, bottom 8 has in its lower part seats, wherein there are located sleeve packings 12 pushed by springs 13. When the cartridge is inserted in the cavity of a valve body, these sleeve packings 12 establish a seal between the bottom 8, and therefore the cartridge, and the lower wall of the valve body (not shown), wherein open the conduits for water inlet.

Figure 2:
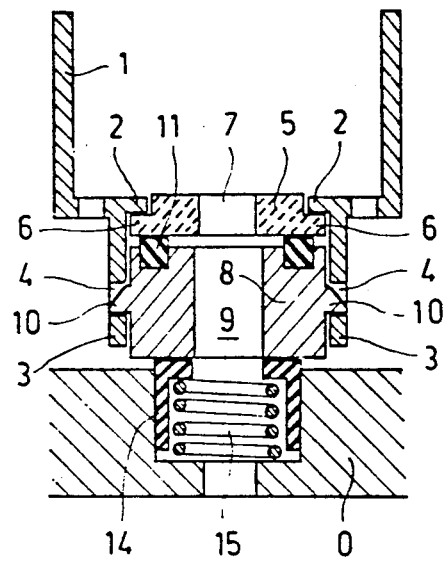
FIGS. 2 to 4 show in similar manner cross sections of bottom ends of valve cartridges, including arrangements of fixed plates according to other embodiments of the invention.

In the embodiment according to FIG. 2, the parts which operatively correspond to parts of the embodiment according to FIG. 1 are designated by the same reference numbers, and they will not be further described. The embodiment according to FIG. 2 differs from the embodiment according to FIG. 1 in the proportioning of the parts, and moreover in that a sleeve packing 14, pushed by a spring 15, is inserted in a seat formed in the lower wall O of a valve body, in order to cooperate with the cartridge bottom 8, which in this case ends at the lower part in a plane surface.

Figure 3:
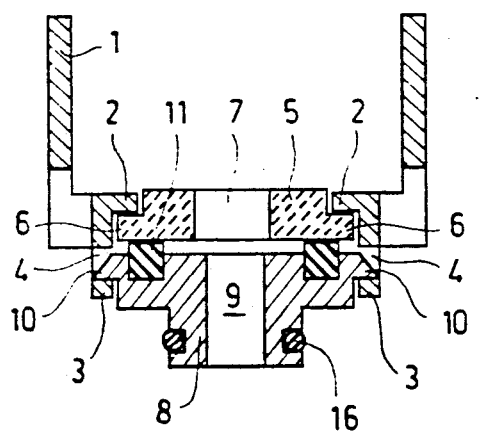

Also in the embodiment according to FIG. 3, the parts which operatively correspond to parts of the embodiment according to FIGS. 1 and 2 are designated by the same reference numbers, and they will not be further described. The embodiment according to FIG. 3 differs from the foregoing one in that bottom 8 is provided with a neck portion having an annular seat wherein there is inserted an annular gasket 16 intended to engaged a hollow cylindrical seat (not shown) of the lower wall of the valve body, in order to act as a hydraulic piston. Such hydraulic action is known per se from other Patents of same Inventor, see particularly the U.S. pat. No. 4,610,268.

Figure 4:
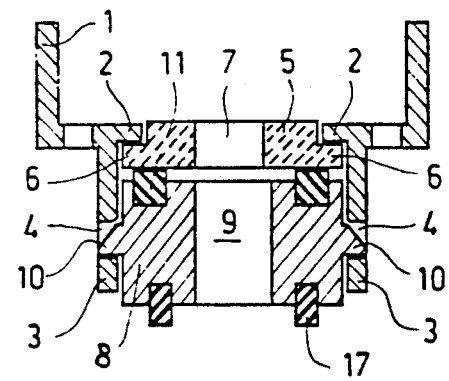

Finally, also in the embodiment according to FIG. 4 the parts which operatively correspond to parts supporting to the embodiment according to FIGS. 1, 2 and 3 are designated by the same reference numbers, and they will not be further described. The embodiment according to FIG. 4 differs from the foregoing ones in that an elastic packing 17 is inserted in an annular seat formed in bottom 8, and it is intended to sealingly cooperate frontally with the plane surface of the bottom wall of a valve body.

As it may be remarked, the embodiments according to FIGS. 1 to 4 substantially differ from one another only in the form and nature of the means provided for sealing between the bottom 8, and therefore the cartridge, and the lower body wall of the valve intended to receive the cartridge. It will be understood, therefore, that it is possible to arrange a cartridge in such a manner that it may receive, as desired, a bottom 8 having sealing means according to FIG. 1, to FIG. 2, to FIG. 3 or to FIG. 4, thus conforming in a simple way to the requirements of different kinds of valves. Such a cartridge, equipped (at least at the time of the manufacture thereof) with several different bottoms 8, may be adapted at the time of mounting the fixed plate, in order to destine the cartridge to a specific kind of valve, selected among several types.

In the examples shown, the connection by retainment means formed by teeth with elastic release has been given supposing that the teeth 10 are formed on bottom 8 and engage openings 4 formed in the cartridge cage 1, but it is to be understood that, on the contrary, some teeth could be formed on the cartridge cage and engage corresponding recesses of the bottom, without any difference in operation. Moreover the connection by means of teeth with elastic release is only the example of an embodiment, particularly economical and practical, of the retainment means intended to operate the compression of the sealing packing 11 of fixed plate 5. However many other connection means may be used to this purpose, including screw connections, forced couplings, solderings and cementing. In effect, there is no absolute need for such retainment means to be dismountable. In all cases the fact that the connection is made between the cartridge cage and the bottom, without directly involving the fixed plate, whose material is brittle and does not allow solderings and cementing, solves in a convenient manner the problem of generating the compression force needed for the packing interposed between the fixed plate and the bottom of a valve cartridge. Moreover this invention, although it offers its maximum advantages when applied to mixer valves, may also find advantageous applications in distribution valves or in simple one-way taps.

It will be understood that, in those cases in which bottom 8 has means cooperating with packings intended to act with respect to the valve body, such means may be in the number of one or more, depending upon the number of water passages for which the seal should be established.

When the fixed plate should be protected in a particularly accurate manner, a yielding packing may also be interposed between flange 6 of the fixed plate 5 and the seat formed by shoulder 2 of the cage 1, or the surface of this shoulder may be formed in such a way as to have some elastic yield.

I claim:

1. A replaceable cartridge for a hydraulic valve, comprising a cartridge cage, a supporting member, a hard material plate mounted, operatively stationary, in said supporting member, said cage having a portion extending a substantial distance beyond said plate in a direction away from said supporting member so as to provide a housing for the cartridge, at least one sealing gasket interposed between said plate and said supporting member, and retainment means intended for applying a pressure to said sealing gasket interposed between said fixed plate and said supporting member, said supporting member for the plate comprising a bottom constructively separate from said cartridge cage and fixedly secured to said cartridge cage; said cartridge cage having a seat for direct support of said fixed plate; said seat and said cage portion being integral with each other; said retainment means acting between said bottom and said cartridge cage, whereby said bottom pushes said fixed plate, through said interposed gasket, against said seat formed in the cartridge cage, without applying to said fixed plate any concentrated stress.

2. A valve cartridge as set forth in claim 1, wherein said cartridge cage has a shoulder which determines said seat from the fixed plate, and said fixed plate has a peripheral projection having the shape of a flange, engaging said seat.

3. A valve cartridge as set forth in claim 1, wherein said bottom has a hollowed seat housing sd interposed gasket.

4. A valve cartridge as set forth in claim 1, wherein said retainment means are in the form of members with elastic release.

5. A valve cartridge as set forth in claim 1, wherein said retainment means comprise first retainment members formed on the bottom and second retainment members formed on the cartridge cage.

6. A valve cartridge as set forth in claim 5, wherein said cartridge has elastically deformable projections on which are formed said second retainment members.

7. A valve cartridge as set forth in claim 1, wherein said bottom has a plane surface adapted to cooperate with at least one sleeve packing with spring, mounted in a seat of a lower all of a valve body.

8. A valve cartridge as set forth in claim 1, wherein said bottom has at least one seat, and the cartridge includes at least one packing inserted in said seat of the bottom and adapted to cooperate with a body of a valve.

9. A valve cartridge as set forth in claim 1, wherein said bottom has at least one hollowed front seat, and the cartridge includes at least one packing inserted in said front seat of the bottom and adapted to frontally cooperate with a lower wall of a valve body.

10. A valve cartridge as set forth in claim 1, wherein said bottom has at least one neck portion, said neck portion has a peripheral seat, and the cartridge includes at least one annular packing inserted in said peripheral seat of the bottom and adapted to act as a piston in a cylindrical seat hollowed in a lower wall of a valve body.

11. A valve cartridge as set forth in claim 1, wherein said bottom has at least one seat, and the cartridge includes at least one sleeve packing and a spring, inserted in said seat of the bottom and adapted to cooperate with a lower wall of a valve body.

* * * * *